(12) United States Patent
Ho et al.

(10) Patent No.: US 12,420,379 B2
(45) Date of Patent: Sep. 23, 2025

(54) METHOD FOR MANUFACTURING A LENS ELEMENT

(71) Applicant: ESSILOR INTERNATIONAL, Charenton-le-Pont (FR)

(72) Inventors: Caroline Ho, Charenton le Pont (FR); Sébastien Pinault, Longpont sur Orge (FR)

(73) Assignee: Essilor International, Charenton-le-Pont (FR)

( * ) Notice: Subject to any disclaimer, the term of this patent is extended or adjusted under 35 U.S.C. 154(b) by 118 days.

(21) Appl. No.: 18/571,938

(22) PCT Filed: Jun. 16, 2022

(86) PCT No.: PCT/EP2022/066457
§ 371 (c)(1),
(2) Date: Dec. 19, 2023

(87) PCT Pub. No.: WO2022/268628
PCT Pub. Date: Dec. 29, 2022

(65) Prior Publication Data
US 2024/0286248 A1    Aug. 29, 2024

(30) Foreign Application Priority Data

Jun. 25, 2021   (EP) .................................. 21315119

(51) Int. Cl.
| | | |
|---|---|---|
| *B24C 1/08* | (2006.01) | |
| *B24C 3/32* | (2006.01) | |
| *B24C 5/04* | (2006.01) | |
| *B29C 33/38* | (2006.01) | |
| *B29D 11/00* | (2006.01) | |
| *B33Y 80/00* | (2015.01) | |

(52) U.S. Cl.
CPC ................ *B24C 1/08* (2013.01); *B24C 3/325* (2013.01); *B24C 5/04* (2013.01); *B29C 33/3842* (2013.01); *B29D 11/00326* (2013.01); *B29D 11/0048* (2013.01); *B33Y 80/00* (2014.12)

(58) Field of Classification Search
CPC .............. B24C 1/08; B24C 3/325; B24C 5/04
See application file for complete search history.

(56) References Cited

U.S. PATENT DOCUMENTS

| | | | |
|---|---|---|---|
| 10,473,827 B1 | 11/2019 | Jenkins et al. | |
| 2006/0079157 A1 | 4/2006 | Van Brug et al. | |
| 2015/0060289 A1 | 3/2015 | Saiki et al. | |

FOREIGN PATENT DOCUMENTS

| | | |
|---|---|---|
| EP | 3730269 A1 | 10/2020 |
| EP | 3730270 A1 | 10/2020 |

OTHER PUBLICATIONS

Beaucamp Anthony et al., "Fluid jet and bonnet polishing of optical moulds for application from visible to x-ray", Optical Manufacturing and Testing IX, SPIE, vol. 8126, No. 1, Sep. 26, 2011, pp. 1-8.
International Search Report for PCT/EP2022/066457, mailed Sep. 12, 2022, 5 pages.
Written Opinion of the ISA for PCT/EP2022/066457, mailed Sep. 12, 2022, 6 pages.

*Primary Examiner* — James Sanders
(74) *Attorney, Agent, or Firm* — NIXON & VANDERHYE (57) ABSTRACT

This relates to a method for manufacturing a lens element including: a refraction area having first curvature; a plurality of optical elements located on at least part of the refraction area, wherein the method includes a step of using an abrasive-filled fluid jet to manufacture the lens element.

19 Claims, 7 Drawing Sheets

METHOD FOR MANUFACTURING A LENS ELEMENT

This application is the U.S. national phase of International Application No. PCT/EP2022/066457 filed Jun. 16, 2022, which designated the U.S. and claims priority to EP Patent Application No. 21315119.4 filed Jun. 25, 2021, the entire contents of each of which are hereby incorporated by reference.

FIELD OF INVENTION

The present invention relates to a method for manufacturing a lens element. Such a lens element is in particular intended to be worn in front of an eye of a wearer.

BACKGROUND AND PRIOR ART

The term "ophthalmic article" is specifically understood to mean a lens, corrective or otherwise, that can be used as spectacle glass, for spectacles for example, particularly sunglasses, goggles, visors or the like.

These ophthalmic articles are in general made of plastic material manufactured by injection molding or casting for example.

Recently a new type of lens has been developed comprising for example arrays of micro-lenses providing in the region they are realised additional optical power. Such lenses are for example developed to prevent in particular progression of myopia.

In order to manufacture such complex ophthalmic articles, specific thermoforming methods or additive manufacturing processing methods have been developed.

However, these methods do not give satisfying results, in particular when there is a need of specific adaptation to a wearer's eye or for small volumes.

Thus there is a need for a method that allows improving manufacturing processes in relationship with such complex ophthalmic articles.

The present invention aims to overcome at least partially some of the above cited drawbacks.

SUMMARY OF THE INVENTION

With this aim, the invention proposes a method for manufacturing a lens element comprising:
a refraction area having first curvature,
a plurality of optical elements located on at least part of the refraction area,
wherein the method comprises a step of using an abrasive-filled fluid jet to manufacture the lens element.

According to further aspects taken alone or in combination:
The method may further comprise steps of
providing a mold having a curved area corresponding to the negative of the refraction area,
microstructuring the mold,
polishing the mold,
wherein an abrasive-filled fluid jet is used for microstructuring the mold and/or polishing the microstructured mold to obtain a final mold for molding said lens element.

Providing a mold comprises for example the step of processing a mold by surfacing or by additive manufacturing or by diamond turning to obtain the mold having said curved area corresponding to the negative of the refraction area.

The method may comprise a step of
processing the refraction area of the lens element, and
wherein the at least one abrasive-filled fluid jet is used for microstructuring the optical elements and/or polishing at least the plurality of optical elements.

The method comprises for example the steps of
processing the refraction area, and
microstructuring the plurality of optical elements, and
wherein the at least one abrasive-filled fluid jet is used for polishing at least the plurality of optical elements.

The step of processing and/or microstructuring may be made by surfacing or by diamond turning or by additive manufacturing.

The method may comprise the following steps:
providing a master piece having a flat surface,
microstructuring through a process using said master piece a mold to obtain a final mold for molding the lens element
polishing the mold,
wherein the least one abrasive-filled fluid jet is used for microstructuring the master piece or the mold and/or polishing the microstructured mold to obtain a final mold for molding the lens element.

The lens element is in particular an ophthalmic article.

The optical elements are for example micro-lenses or microstructures.

The micro-lenses or microstructures are for example considered as an optical microstructure having physical Z deformation/height between [0.1 µm-50 µm], and width/length or diameter between [0.5 µm, 1.5 mm].

The abrasive-filled fluid jet may be projected by an abrasive filled jet machining device, the abrasive filled jet machining device having at least one nozzle with a diameter of less than 0.5 mm, in particular equal or less than 0.3 mm.

The abrasive filled jet machining device can comprise a nozzle head having at least a first nozzle for coarse treatment and a second nozzle for fine treatment and the method comprises a coarse treatment and a subsequent fine treatment.

The abrasive filled fluid jets projected from the first nozzle and the second nozzle may be projected as pulses alternately in a time division multiplexing fashion.

The abrasive-filled fluid jet is for example maintained perpendicular to the surface to be machined.

The invention also relates to an abrasive filled fluid jet device for ophthalmic applications comprising
a blocking unit to secure and maintain a lens element/a mold/a master piece,
a nozzle head having at least a first nozzle for coarse microstructuring or/and polishing and a second nozzle for fine microstructuring or/and polishing.

The first nozzle may be oriented perpendicular to said front face during fluid jet polishing and the second nozzle may be oriented with an angle with regard to the fluid jet projected from the first nozzle.

The diameter of the first nozzle is for example smaller than the diameter of the second nozzle. Therefore the second nozzle may be used for a coarse treatment whereas the first nozzle may be used for fine treatment.

The first nozzle and the second nozzle can be supplied by the same or by different polishing fluids, the size of the particles supplying the first nozzle being more important than the size of the particles supplying the second nozzle.

BRIEF DESCRIPTION OF THE DRAWINGS

Other advantages and features will become apparent upon reading the description of the following figures, among which.

DETAILED DESCRIPTION

On all the figures, the same elements bear the same reference numbers.

The following embodiments are only examples. Although the description refers to one or several embodiments, the invention is not limited to these embodiments. In addition, a feature described in relationship with one embodiment may also concern another embodiment even if this is not mentioned expressively. Simple features of different embodiments may also be combined to provide further realizations.

In the present description, by "front" or "rear" face of a layer or a lens element or surface, reference is made to the propagation of the rays of light towards the eye through the ophthalmic lens when an ophthalmic device bearing the ophthalmic lens is worn on a wearer's face. Thus a "front" face is always that which is farest away to the eye of the user and therefor closest to the field of view and a "rear" face is always that which is closest to the eye of the user.

The disclosure relates to a lens element intended to be worn in front of an eye of a wearer.

In the context of the present disclosure, the term "lens element" can refer to an uncut optical lens or a spectacle optical lens edged to fit a specific spectacle frame or an ophthalmic lens and an optical device adapted to be positioned on the ophthalmic lens. The optical device may be positioned on the front or back surface of the ophthalmic lens. The optical device may be an optical patch. The optical device may be adapted to be removably positioned on the ophthalmic lens for example a clip configured to be clipped on a spectacle frame comprising the ophthalmic lens.

In the context of the present disclosure, an optical element is considered as an optical microstructure having physical Z deformation/height between [0.1 μm-50 μm], and width/length or diameter in case of circular geometry between [0.5 μm, 1.5 mm]. Such an optical element provides an optical wavefront modification on its intensity, curvature, or light deviation. These microstructures have preferably periodical or pseudo periodical layout, but may also have randomized positions.

The microstructures (optical elements) can be absorptive or not. In case they are absorptive, they may be absorptive locally up to 100%.

The microstructures can also locally modify wavefront curvature, in particular with a range of +/−20 Diopters.

The microstructures can also locally scatter light, in particular with a scattering angle ranging from +/−1° to +/−30°.

The term "locally" means in the present context at intersection between microstructures and wavefront.

The term "microstructuring" means to realize microstructures/optical elements as defined above.

A preferred layout for microstructures comprises for example grid dispositions with a constant grid step, a honeycomb layout, multiple concentric rings, and/or contiguous, dispositions without space in between microstructures.

The distance between microstructures may range from 0 (contiguous microstructures) to 3 times microstructure X or Y size (separate microstructures).

Examples of lens elements with optical elements (microstructures) located thereon are for example disclosed in EP3759545 or EP EP3785072 which are incorporated by reference in the present description.

Figure 1:
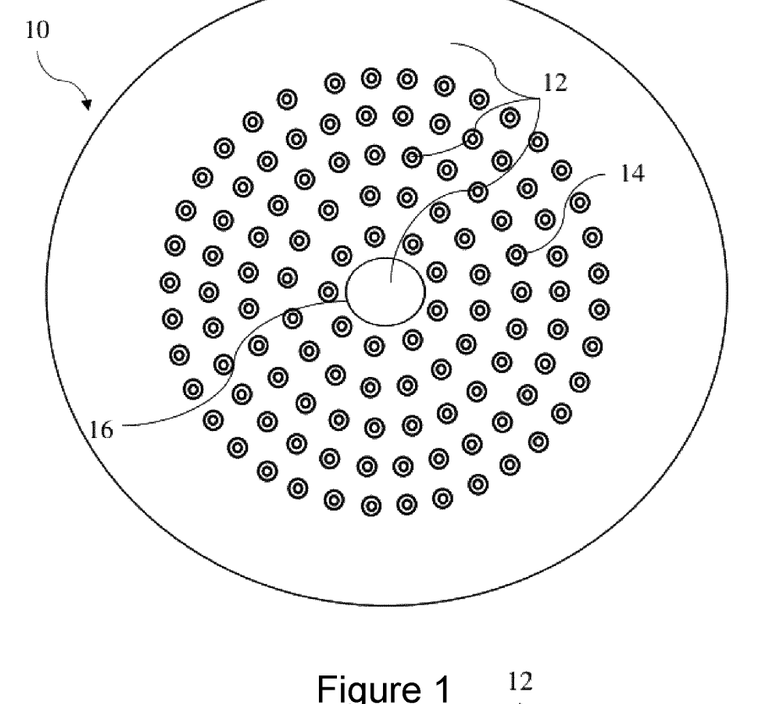
FIG. 1 is a plan view of a lens element according to an embodiment of the disclosure.
Figure 2:
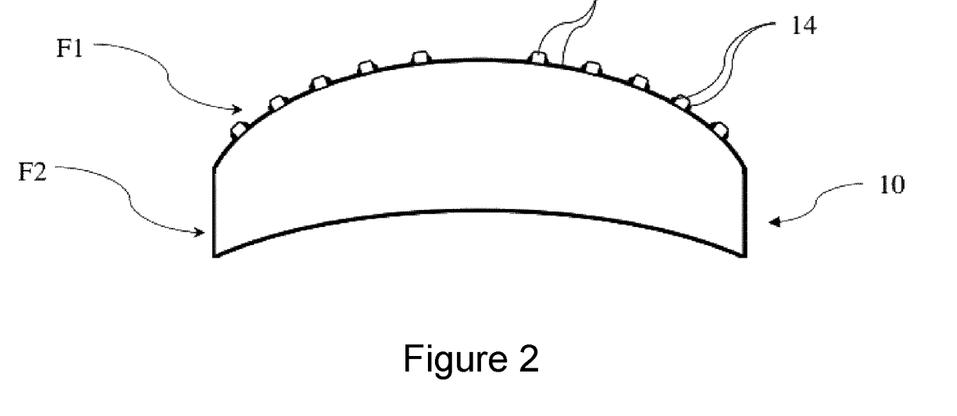
FIG. 2 is a general profile view of a lens element according to an embodiment of the disclosure.

As represented on FIGS. 1 and 2, a lens element 10 according to the disclosure comprises:

a refraction area 12, and a plurality of optical elements 14 located on at least part of the refraction area.

The optical elements 14 may be made of the same material as lens element 10, for example a thermoplastic material used for manufacturing of ophthalmic articles.

The optical elements 14 are in FIGS. 1 and 2 protruding from the front face F1 and can be considered as a plurality of respectively independent island-shaped areas.

In the sense of the disclosure, two optical elements 14 are considered as independent if producing independent images.

In particular, when illuminated by a parallel beam "in central vision", each "independent contiguous optical element" forms on a plane in the image space a spot associated with it. In other words, when one of the "optical elements" 14 is hidden, the spot disappears even if this specific optical element 14 is contiguous with another optical element.

The refractive area 12 is preferably formed as the area other than the areas formed by the plurality of optical elements 14. In other words, the refractive area 12 is the complementary area to the areas occupied by the plurality of optical elements 14.

The refraction area 12 is configured to provide to the wearer in standard wearing conditions, in particular for foveal vision, a first optical power based on the prescription of the wearer for correcting an abnormal refraction of said eye of the wearer.

The wearing conditions are to be understood as the position of the lens element with relation to the eye of a wearer, for example defined by a pantoscopic angle, a Cornea to lens distance, a Pupil-cornea distance, a center of rotation of the eye (CRE) to pupil distance, a CRE to lens distance and a wrap angle.

A lens element 10 as presented on FIGS. 1 and 2 is manufactured by using at one level of manufacturing a step of projecting an abrasive-filled fluid jet. The used fluid may be for example air or water.

Use of abrasive-filled fluid jet may intervene at different levels in the manufacturing process, in particular:

i) by projecting directly an abrasive-filled fluid jet on a lens element 10 for forming optical elements 14 on the front face F1, ii) by projecting directly an abrasive-filled fluid jet on a lens element 10 for polishing optical elements 14 which are already disposed on the front face F1, iii) by projecting directly an abrasive-filled fluid jet on a surface of a mold used for lens manufacturing, in particular by injection molding and where the abrasive-filled fluid jet is projected to form and/or polish in negative what will correspond to optical elements 14 and the refraction area 12, once molded, iv) by projecting directly an abrasive-filled fluid jet for manufacturing a master piece having a flat main surface bearing a utilitary microstructure which is then used to realize a mold for manufacturing of said lens element 10 by injection molding, the microstructure being configured to shape the mold in order to get lens element 10 with said optical elements 14 and the refraction area 12.

For abrasive-filled fluid jet projection, the pressure of the project fluid jet may be comprised between 2-20 bars (0.2-2 MPa), typically around 4 bars (0.4 MPa).

The abrasive particles contained in the fluid jet may be for example Al2O3 with particle size of 5-15 μm, SiC with particle size of 3-65 μm or CeO2 with particle size around 1 μm.

The concentration of the abrasive particles in the fluid jet can range from 0.01%-50% of weight, typically 5-15% of weight, in particular 10% of weight.

For projection, the stand-off distance of a nozzle projecting the fluid jet may be comprised in a range of 1-20 mm, in particular 8 mm.

The diameter of such a nozzle for abrasive filled fluid jet projection may be in a range of 0.1-1 mm, typically 0.3 mm.

The surface to be treated by abrasive filled fluid jet projection may be attacked in particular by right angle (90°). However, projection at an angle other than 90° is also possible.

Depending in particular on the pressure, the trajectory and the forward speed of the abrasive filled fluid jet during projection, the abrasive filled fluid jet may have a shaping/surface forming action or a polishing action.

Abrasive filled fluid jet may therefore be used for roughness reduction, shape corrections and shaping, in particular microstructuring.

Figure 3:
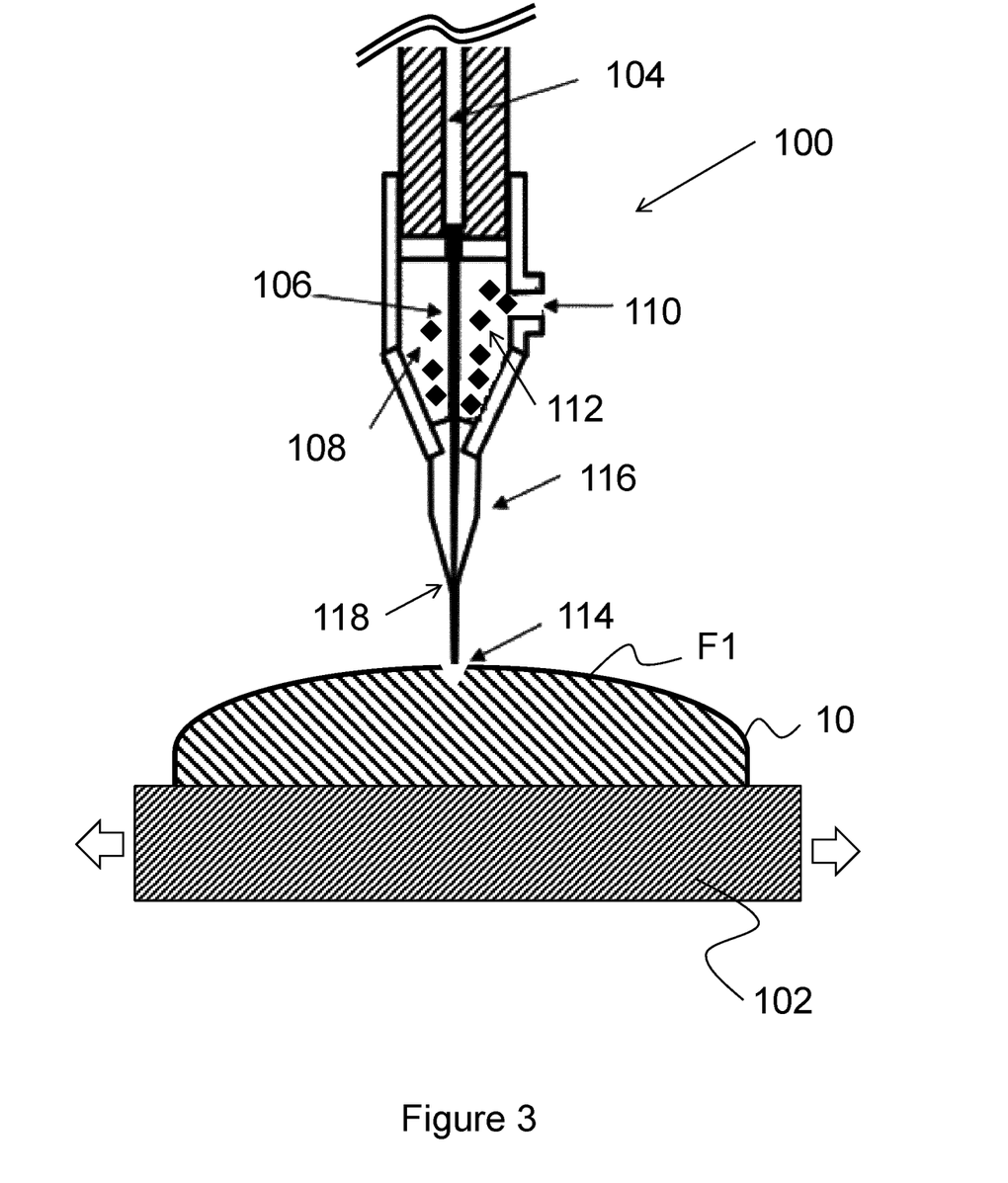
FIG. 3 is a schematic representation of an abrasive filled jet machining device.

FIG. 3 is a schematic representation of an abrasive filled jet machining device 100 and a lens element 10 which is blocked for example by a mobile block piece 102. Such block pieces 102 are for example subject of German Standard DIN 58 766.

Reference 104 designates high-pressure water that is ejected as a water jet 106 in a mixing chamber 108. The mixing chamber 108 presents an inlet 110 for abrasives 112. The water jet 106 and the abrasives 112 are mixed together and projected as an abrasive filled fluid jet 114 through a nozzle head 116 having one or several nozzles 118 in direction to the lens element 10 for ablation of material of the lens element 10. The abrasive filled fluid jet 114 impinges the lens element 10 in this embodiment at right angle.

According to an alternative embodiment (not shown), the high pressure water may contain abrasives and be a ready to be used. In this case, device 100 does not need to have a dedicated mixing chamber.

The block piece 104 is mobile (as shown by the arrows) and its position is for example controlled by a drive unit (not represented). Thus, during treatment by the abrasive filled jet machining device 100, the lens element 10 may be moved not only in a plan (X-Y direction), but may also be tilted in order that the abrasive filled fluid jet 114 impinges the lens element 10 at right angle. Of course, it is also possible that the device 100, in particular the part supporting the nozzle head 116 is mounted for example on a five axis servo system that controls the movement in x/y/z direction and two tilting angles for maintaining the abrasive filled fluid jet 114 always perpendicular to the surface to be machined. In other embodiments, the abrasive filled fluid jet 114 may attack the front face F1 of the lens element 10 at an angle which differs to 90°.

In function of several treatment parameters like forward speed, pressure, concentration of the abrasive charged in the fluid etc, the abrasive filled fluid jet 114 may be configured to shape for example the front face F1 or to reduce only roughness of front face F1 (polishing action).

The slurry of the fluid jet with the abrasive may be recycled, in particular in recovering the slurry and purifying at least partially through an adapted filter system. In particular when the part to be machined by the abrasive filled fluid jet is made of a ferromagnetic metal, a magnet system can be used to remove the metal particles form the slurry.

Figure 4A:
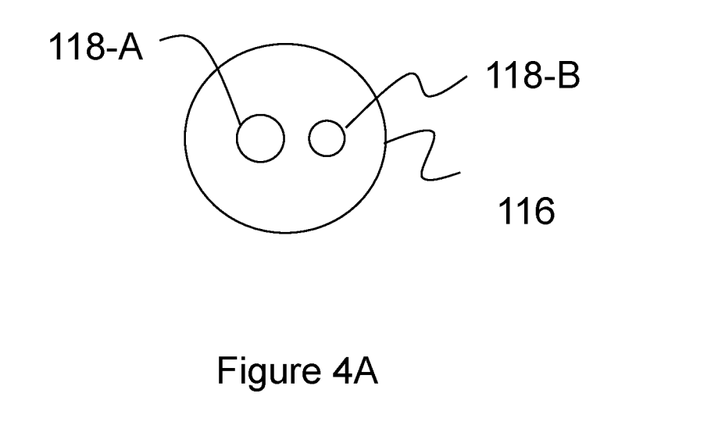
FIG. 4A is a top view of a nozzle head of an abrasive filled fluid jet machining device.

FIG. 4A shows a top view of an embodiment with a nozzle head 116 comprising several nozzles for example 118-A and 118-B.

For example first nozzle 118-A is configured for coarse treatment, in particular ablation, and second nozzle 118-B for fine treatment, in particular fine shaping and/or polishing. For example nozzle 118-B may have a smaller diameter than nozzle 118-A.

In functioning nozzles 118-A and 118-B are controlled independently, in particular an abrasive filled fluid jet is either projected from nozzle 118-A or from 118-B, but not at the same time. In particular a TDM (Time Division Multiplexing) approach may be interesting, meaning that the abrasive filled fluid jets projected from nozzles 118-A and 118-B are projected as pulses alternately.

Figure 4B:
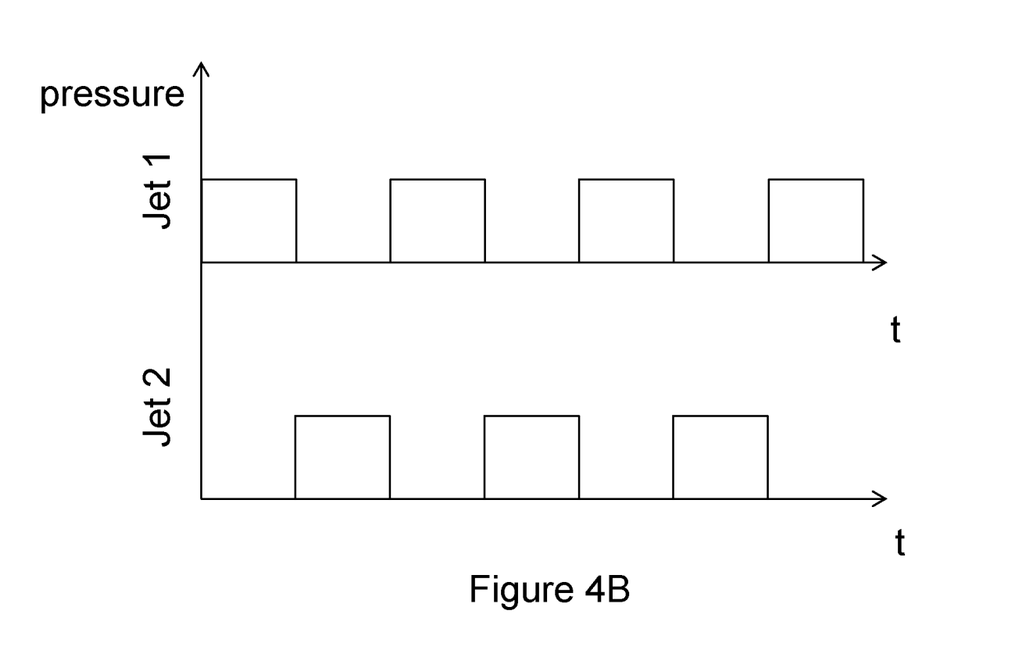
FIG. 4B shows an example of a graphics of alternate projection of two abrasive filled fluid jets.

This is schematically shown in FIG. 4B. "Jet 1" corresponds for example to an abrasive filled fluid jet projected by nozzle 118-A for coarse treatment and "jet 2" corresponds for example to an abrasive filled fluid jet projected by nozzle 118-B for fine treatment.

In this example, "jet 1" and "jet 2" are pulsed jets which are alternately projected. The pulse duration in this example for "jet 1" and "jet 2" are the same. In a further development, the pulse duration for "jet 1" for coarse treatment is in particular smaller than the pulse duration for "jet 2" for fine treatment.

Such TDM approach allows that nozzles 118-A and 118-B are quite close to each other, in particular less than 1 mm or even less than 0.5 mm. "Jet 1" and "jet 2" can work perfectly without disturbing each other. In this case, there is the benefit that coarse and fine treatment can be realized nearly at the same time at a specific location. This is also a gain in time, because less movements to position the abrasive filled jet machining device 100 with respect to lens element 10 are necessary.

The first nozzle 118-A may be oriented perpendicular to said front face F1 during fluid jet polishing and the second nozzle 118-B may be oriented also perpendicular to said front face or, as alternative, with an angle with regard to the abrasive filled fluid jet projected from the first nozzle 118-A.

The first nozzle 118-A and the second nozzle 118-B may be supplied by the same or different polishing/machining fluids, the size of the particles supplying the first nozzle 118-A being in particular more important than the size of the particles supplying the second nozzle 118-B. In case of different polishing fluids, the abrasive filled jet machining device 100 may comprise for example different tanks, one for each polishing/machining fluid.

Hereafter will be described several exemplary embodiments of the invention.

Embodiment 1: Abrasive Filled Fluid Jet Polishing

According to a first embodiment, the abrasive filled jet-fluid is used for polishing. In particular in the case where optical elements 14 with sharp edges are disposed on front face F1, use of an abrasive filled fluid jet is quite interesting to smooth the edges that may lead for example to undesirable reflexions.

Embodiment 2: Abrasive Filled Fluid Jet Microstructuring and Polishing

According to a second embodiment, a lens element 10 with a smooth surface F1 is for example provided an abrasive filled fluid jet is projected on the front face F1 to let the optical elements 14 "emerge". This can be done for example with an abrasive filled jet machining device 100 as shown in FIG. 3 and with two nozzles as shown in FIG. 4.

In this case, material is ablated from the front face of the lens element 10, but only in the refractive area 12, meaning everywhere but at the location of the optical elements 14. A judicious way to proceed would be a coarse treatment for example with nozzle 118-A and then a fine treatment with nozzle 118-B. After ablation, the abrasive filled jet machining device 100 may be configured to switch in a polishing mode for finishing of the front face F1.

With regard to embodiments 1 and 2, one may for example provide before use of abrasive filled fluid jet machining a lens blank which is made by surfacing, diamond turning or additive manufacturing.

In this embodiment, sculpturing the microstructures/optical elements 14 is performed directly on the front face F1. This is in particular interesting for adapting a lens element 10 directly to the need of a specific user.

Embodiment 3: Abrasive Filled Fluid Jet Microstructuring of a Mold for Manufacturing of Injection Molded Optical Lenses Abrasive filled fluid jet machining can also be used for microstructuring a mold intended to be used for manufacturing lens elements 10 in particular by injection molding. Such technique is also well suited for high volume manufacturing.

In general, a mold for manufacturing lens elements comprises for example two mold-halves where each mold halve is shaped in "negative" what would be the shape of the relevant lens element shape in "positive".

Figure 5:
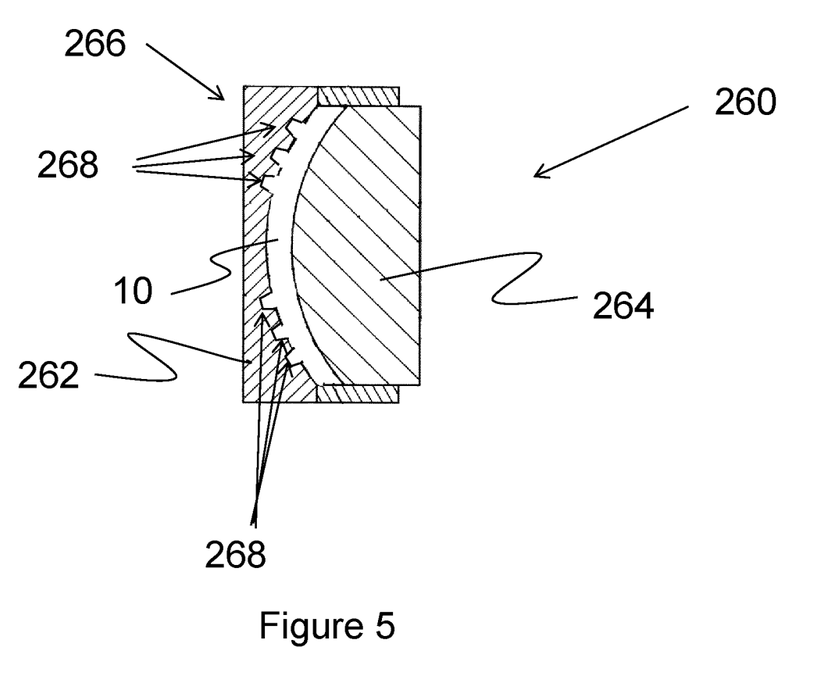
FIG. 5 shows a schematic example of a cross section of a mold for manufacturing lens elements according the invention.

FIG. 5 shows for example an injection molding installation 260 or injection mold comprising a concave mold half 262 and a convex mold half 264.

The molds halves 262 and 264 are made of metal, or ceramics for example.

The concave mold 262 has been prepared and comprises in a zone 266 the negative pattern 268 of the optical elements 14, for example micro-lenses. For illustrative purposes, the sizes of the negative pattern 268 are exaggerated with regard to the size of the mold.

Figure 6:
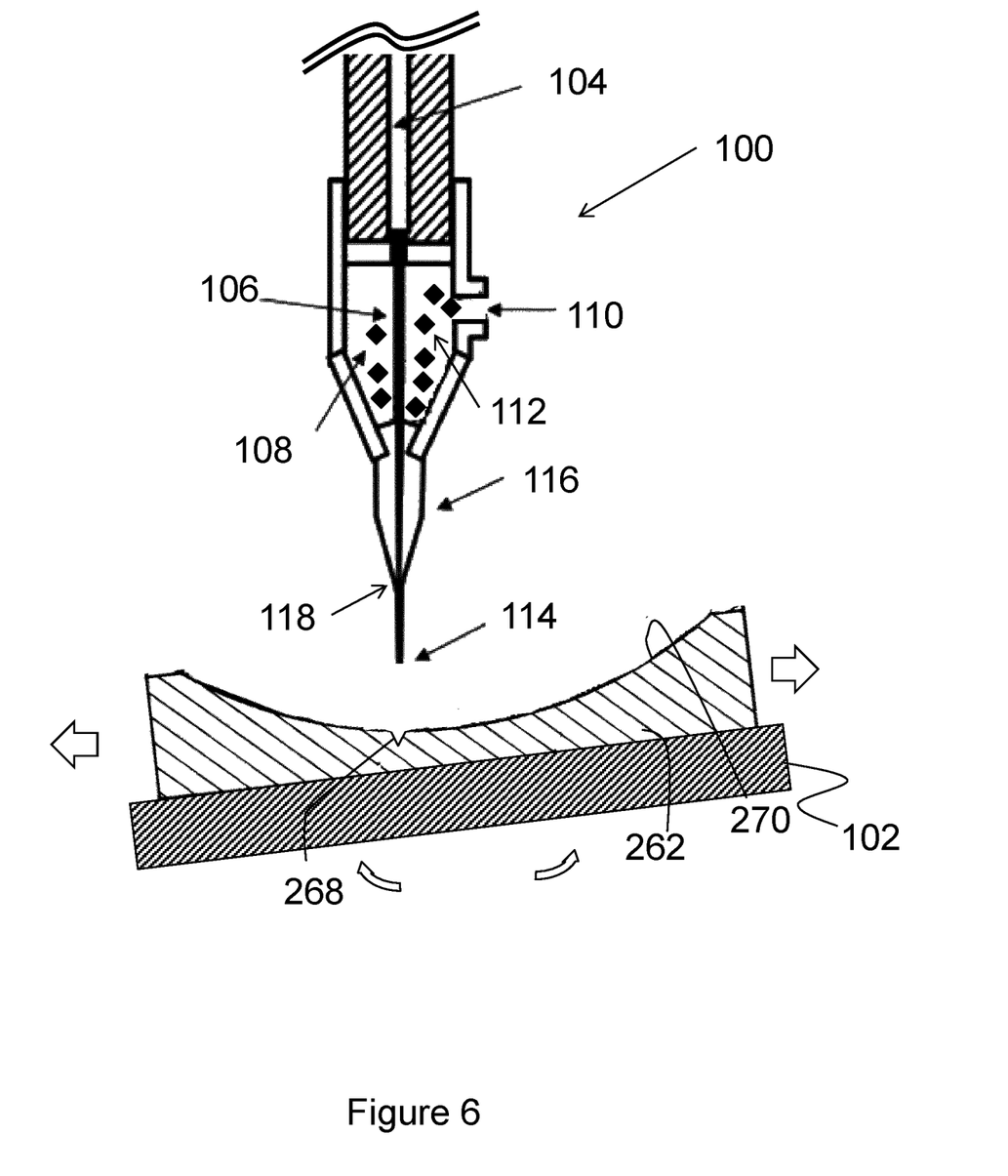
FIG. 6 is a schematic representation of an abrasive filled jet machining device which is microstructuring a mold-half.

FIG. 6 shows an abrasive fluid jet machining device 100 similar to the device already described with regard to FIG. 3 and configured for microstructuring and/or polishing metal mold halves.

FIG. 6 shows that metal mold half 262 presents a smooth curved area 270 having a curvature that corresponds to the negative of the refraction area 12 and will correspond, after manufacturing by injection molding using such mold half 262, to the refraction area 12.

The abrasive filled fluid jet 114 is projected towards the mold half 262 to locally ablate the metal of the mold half 262 to form negative pattern 268 which will correspond after injection molding to the optical elements 14. This corresponds to a step of microstructuring of mold half 262.

In this embodiment too, it is also possible that the device 100, in particular the part supporting the nozzle head 116 is mounted for example on a five axis servo system that controls the movement in x/y/z direction and two tilting angles for maintaining the abrasive filled fluid jet 114 always at perpendicular to surface of the mold half 262 to be machined.

The smooth curved area 270 may also be shaped by abrasive filled fluid jet machining, in particular with a coarse treatment. As an alternative, the mold half 262 is first realized with conventional diamond turning in order to obtain smooth curved area 270 that corresponds mirror-inverted to the general form the front face F1 of a lens element 10 to be manufactured. The mold half 262 may be provided by processing a mold half by surfacing, by additive manufacturing or by diamond turning to obtain the mold half having the curved area 270 corresponding to the negative of the refraction area 12.

Once the mold half 262 is microstructured with pattern 268, it is polished in particular in using abrasive filled fluid jet projection to get a finished final mold that can be used for manufacturing of lens elements 10.

According to one embodiment, the mold part 262 may be an interchangeable mold insert.

When the mold 260 is then used for manufacturing of lens elements 10 through injection molding for example, the micro-optical forms that correspond to optical elements 14 are directly realized.

Embodiment 4: Abrasive Filled Fluid Jet Microstructuring of a Master Piece for Manufacturing of a Mold Intended for Injection Molding of Optical Lenses US2006/0096865 which is incorporated by reference to the present description, discloses a process for making a mold piece having a main curved surface bearing a utilitary microstructure.

In summary, this process disclosed in US2006/0096865 comprises:
  transferring a utilitary microstructure from a master piece main surface to a main surface of a flat cured elastomeric film;
  pressing the cured elastomeric film and a master article against each other so as to conform the overall shape of said cured elastomeric film to the curved shape of the main surface of the master article and to spread over a curable coating composition between the curved main surface of the master article and the main surface bearing the replica of the said utilitary microstructure of the cured elastomeric film;
  curing the coating composition;
  removing the cured elastomeric film and depositing a layer of a metal or a metallic alloy on the exposed main surface of the hard coating of the master article; and recovering said metal or metallic alloy layer to obtain a mold piece having a curved main surface bearing a replica of said transferred utility microstructure.

For more precision and details, US2006/0096865 can be consulted.

With respect to the present invention, the utility microstructure to be transferred corresponds to the optical elements 14.

Figure 7A:
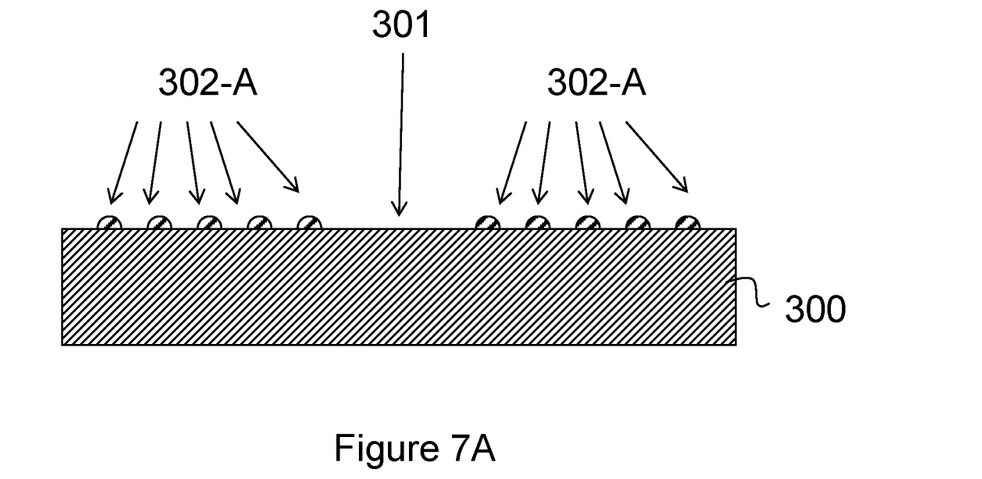
FIG. 7A shows a first schematic example of a cross section of a master piece for microstructuring molds.
Figure 8:
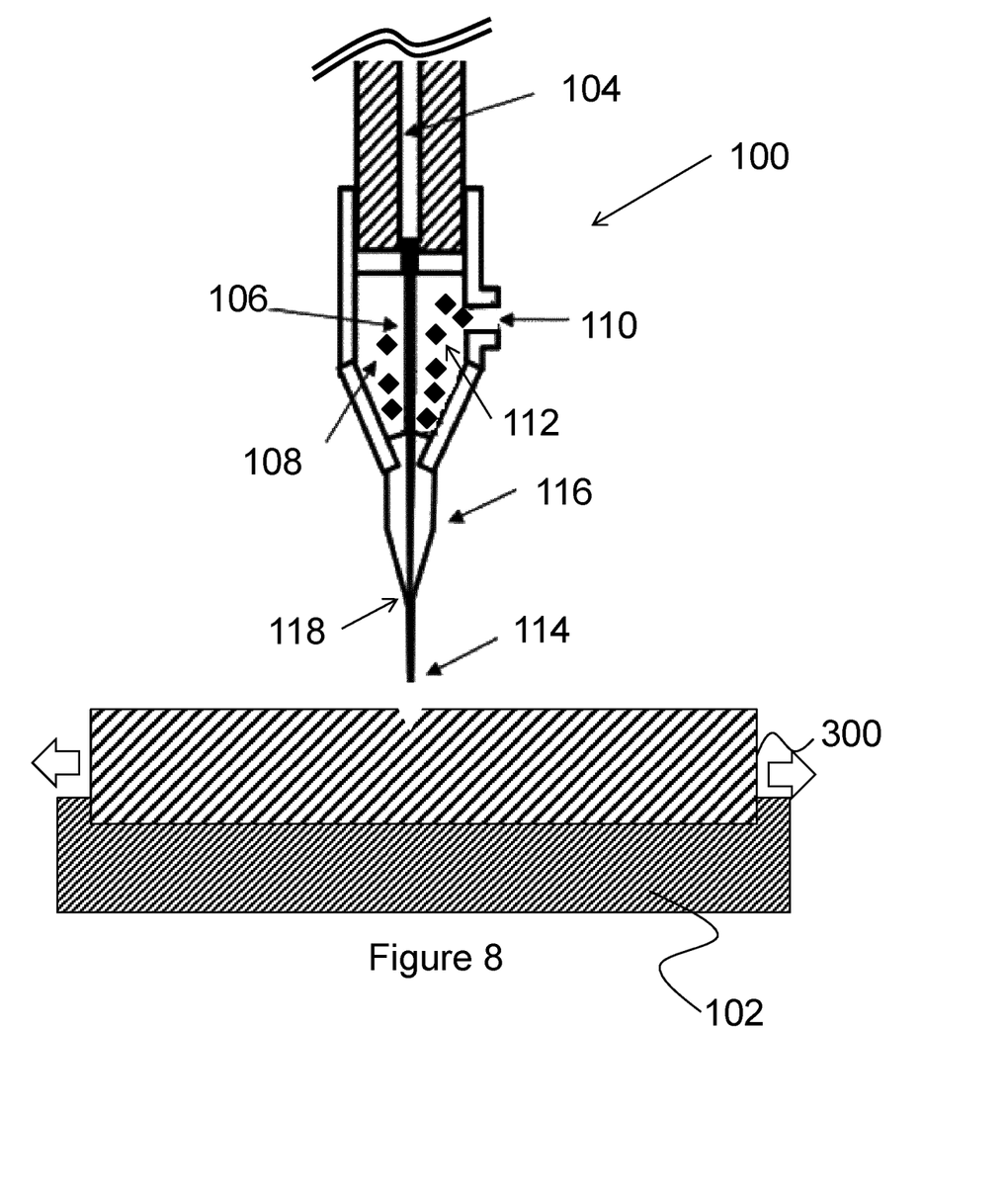
FIG. 8 is a schematic representation of an abrasive filled jet machining device which is microstructuring a master piece.

In this case, as shown in FIG. 7A, a master piece or master mold 300 having a flat surface 301 and bearing for example protrusions 302-A having a shape corresponding to the shape of the optical elements 14 to be realised on the front face F1 of the lens element 10, are realised by abrasive filled fluid jet machining as shown in FIG. 8. In this case, the use of the abrasive fluid jet machining is quite similar to that described in relation to FIG. 6 related to mold half 262 with the difference that master piece 300 is of flat shape.

Figure 7B:
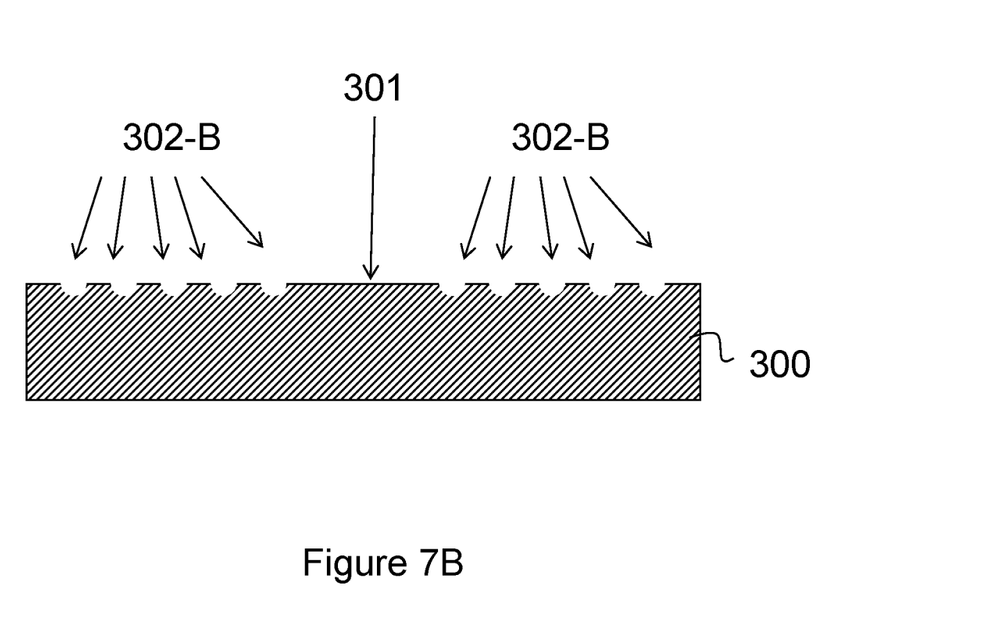
FIG. 7B shows a second schematic example of a cross section of a master piece for microstructuring molds.

According to an example shown in FIG. 7B, a master piece or master mold 300 having a flat surface and bearing for example cut-outs/notches 302-B having a hollow shape corresponding to the shape of the optical elements 14 to be realised on the front face F1 of the lens element 10, are realised by abrasive filled fluid jet machining as shown in FIG. 8.

Whereas for the master piece 300 in FIG. 7A, a layer of material of the master piece 300 is removed by abrasive filled fluid jet machining everywhere except at the locations of the protrusions 302-A in order to let emerge the latter as described in relationship with the second embodiment, the master piece 300 in FIG. 7B, the material of the master piece 300 is removed by abrasive filled fluid jet machining only at the locations of the cut-outs 302-B.

The flat master piece can be made of any suitable material but is preferably made of metal or a metallic alloy and in particular of nickel.

Once the mold has been obtained by the process described in US2006/0096865 in particular to FIGS. 1B-1J, the obtained mold half which would be similar to mould half 262 of FIGS. 5 and 6 can also be polished in using abrasive fluid jet projection.

One therefore understands the advantages to use abrasive filled fluid jet projection for sculpturing microstructures or polishing.

The invention claimed is:

1. Method for manufacturing a lens element comprising:
   a refraction area having first curvature,
   a plurality of optical elements located on at least part of the refraction area,
   wherein the method comprises a step of using an abrasive-filled fluid jet to manufacture the lens element, the abrasive-filled fluid jet is projected by an abrasive filled jet machining device, the abrasive filled jet machining device having at least one nozzle with a diameter of less than 0.5 mm, the abrasive filled jet machining device comprises a nozzle head having at least a first nozzle for coarse treatment and a second nozzle for fine treatment and the method comprises a coarse treatment and a subsequent fine treatment, and the abrasive filled fluid jets projected from the first nozzle and the second nozzle are projected as pulses alternately in a time division multiplexing fashion.

2. The method for manufacturing an ophthalmic lens element according to claim 1, further comprising
   providing a mold having a curved area corresponding to the negative of the refraction area,
   microstructuring the mold,
   polishing the mold,
   wherein an abrasive-filled fluid jet is used for microstructuring the mold and/or polishing the microstructured mold to obtain a final mold for molding said lens element.

3. The method for manufacturing a lens element according to claim 2,
   wherein providing a mold comprises processing a mold by surfacing or by additive manufacturing or by diamond turning to obtain the mold having said curved area corresponding to the negative of the refraction area.

4. The method for manufacturing a lens element according to claim 1 wherein the method comprises
   processing the refraction area of the lens element, and
   wherein the at least one abrasive-filled fluid jet is used for microstructuring the optical elements and/or polishing at least the plurality of optical elements.

5. The method for manufacturing a lens element according to claim 1 wherein the method comprises
   processing the refraction area, and
   microstructuring the plurality of optical elements, and
   wherein the at least one abrasive-filled fluid jet is used for polishing at least the plurality of optical elements.

6. The method for manufacturing a lens element according to claim 4, wherein the step of processing and/or microstructuring is made by surfacing or by diamond turning or by additive manufacturing.

7. The method for manufacturing a lens element according to claim 1
   wherein the method comprises
   providing a master piece having a flat surface,
   microstructuring through a process using said master piece a mold to obtain a final mold for molding the lens element
   polishing the mold,
   wherein the least one abrasive-filled fluid jet is used for microstructuring the master piece or the mold and/or polishing the microstructured mold to obtain a final mold for molding the lens element.

8. The method according to claim 1, where the lens element is an ophthalmic article.

9. The method according to claim 1, where said optical elements are micro-lenses or microstructures.

10. The method according to claim 9 wherein the microlenses or microstructures are considered as an optical microstructure having physical Z deformation/height in a range of 0.1 um-50 um, and width/length or diameter in a range of 0.5 um-1.5 mm.

11. The method according to claim 1, where the abrasive-filled fluid jet is projected by an abrasive filled jet machining device, the abrasive filled jet machining device having at least one nozzle with a diameter of less than 0.5 mm.

12. The method according to claim 11, wherein the abrasive filled jet machining device comprises a nozzle head having at least a first nozzle for coarse treatment and a second nozzle for fine treatment and the method comprises a coarse treatment and a subsequent fine treatment.

13. The method according to claim 12, wherein the abrasive filled fluid jets projected from the first nozzle and the second nozzle are projected as pulses alternately in a time division multiplexing fashion.

14. The method according to claim 1, where the abrasive-filled fluid jet is maintained perpendicular to the surface to be machined.

15. The method for manufacturing a lens element according to claim 5, wherein the step of processing and/or microstructuring is made by surfacing or by diamond turning or by additive manufacturing.

16. The method according to claim 15, where the lens element is an ophthalmic article.

17. The method according to claim 16, where said optical elements are micro-lenses or microstructures.

18. The method according to claim 17, where the abrasive-filled fluid jet is projected by an abrasive filled jet machining device, the abrasive filled jet machining device having at least one nozzle with a diameter of less than 0.5 mm.

19. The method of claim 18, wherein the abrasive filled jet machining device has at least one nozzle with a diameter of less than 0.3 mm.

* * * * *